United States Patent
Kim et al.

(10) Patent No.: US 11,407,277 B2
(45) Date of Patent: Aug. 9, 2022

(54) THERMAL ENERGY CONTROL APPARATUS FOR HYBRID VEHICLE, THERMAL ENERGY CONTROL METHOD THEREOF AND HYBRID VEHICLE INCLUDING THE SAME

(71) Applicants: Hyundai Motor Company, Seoul (KR); Kia Motors Corporation, Seoul (KR)

(72) Inventors: Jong Hyuck Kim, Gyeonggi-do (KR); Jang Hyo Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 369 days.

(21) Appl. No.: 16/655,474

(22) Filed: Oct. 17, 2019

(65) Prior Publication Data
US 2020/0338957 A1    Oct. 29, 2020

(30) Foreign Application Priority Data
Apr. 24, 2019    (KR) .................. 10-2019-0047667

(51) Int. Cl.
*B60H 1/00*    (2006.01)
*F01P 7/02*    (2006.01)
*F01P 7/14*    (2006.01)

(52) U.S. Cl.
CPC ......... *B60H 1/00885* (2013.01); *B60H 1/004* (2013.01); *F01P 7/026* (2013.01); *F01P 2007/146* (2013.01)

(58) Field of Classification Search
CPC ........ F01P 7/026; F01P 7/02; F01P 2007/146; F01P 2007/168; B60H 1/00885; B60H 1/004; B60K 11/085
See application file for complete search history.

(56) References Cited

U.S. PATENT DOCUMENTS

| | | | |
|---|---|---|---|
| 8,833,313 B2* | 9/2014 | Lockwood | B60K 11/085 123/41.04 |
| 9,827,846 B2* | 11/2017 | Porras | B60L 58/26 |
| 10,450,941 B2* | 10/2019 | Cunningham | F01P 7/10 |
| 2016/0222867 A1* | 8/2016 | Lee | B60K 11/085 |
| 2018/0112586 A1* | 4/2018 | Kwon | F01P 7/048 |
| 2020/0338957 A1* | 10/2020 | Kim | F01P 7/026 |

* cited by examiner

*Primary Examiner* — Jenna M Hopkins
(74) *Attorney, Agent, or Firm* — Fox Rothschild LLP

(57) ABSTRACT

A thermal energy control apparatus for a hybrid vehicle is capable of efficiently managing thermal energy. The apparatus includes an integrated thermal management (ITM) unit that adjusts a coolant temperature by opening or closing a radiator valve and an active air flap (AAF) unit that adjusts an intake amount of ambient air by opening or closing a flap valve. A cooperative controller cooperatively operates the ITM and AFF units. The cooperative controller determines, based on a coolant temperature, whether a cooperative control mode is to be executed, adjusts an opening degree of the flap valve when the cooperative control mode is a cooperative control mode of the AFF unit, and adjusts an opening degree of the radiator valve when the cooperative control mode is a cooperative control mode of the ITM unit.

20 Claims, 8 Drawing Sheets

THERMAL ENERGY CONTROL APPARATUS FOR HYBRID VEHICLE, THERMAL ENERGY CONTROL METHOD THEREOF AND HYBRID VEHICLE INCLUDING THE SAME

CROSS-REFERENCE TO RELATED APPLICATION(S)

This application claims the benefit of Korean Patent Application No. 10-2019-0047667 filed on Apr. 24, 2019, which is hereby incorporated by reference as if fully set forth herein.

BACKGROUND

Field of the Invention

The present invention relates to an apparatus for controlling thermal energy in a hybrid vehicle, and more particularly, to a thermal energy control apparatus for a hybrid vehicle capable of efficiently managing thermal energy through cooperative control of an opening degree of an active air flap (AAF) and an opening degree of an integrated flow rate control valve of an integrated thermal management (ITM) unit, a thermal energy control method thereof, and a hybrid vehicle including the same.

Discussion of the Related Art

Generally, a hybrid electric vehicle (HEV) is a vehicle utilizing two types of power sources. In particular, the two types of power sources are mainly an engine and an electric motor. Recently, active development has been conducted in regards to a hybrid vehicle since the hybrid vehicle exhibits superior fuel economy and excellent power performance, while being advantageous in terms of exhaust gas reduction, as compared to vehicles equipped with an internal combustion engine alone. Hybrid vehicles may include an integrated thermal management (ITM) system having an integrated coolant control valve and an active air flap system.

Particular, the ITM system is a system for securing an integrated thermal management function through adjustment and control of a flow rate of a coolant using a DC motor. This system may adjust temperature of the coolant in an increasing direction during low-speed or medium-speed operation of the vehicle, or may adjust temperature of the coolant in a decreasing direction during high-speed or high-load operation of the vehicle.

On the other hand, the active air flap system is a system for adjusting an intake amount of ambient air by a flap mounted between a radiator grill and a radiator. The flap may be opened for cooling in a high temperature state, taking into consideration temperatures of main elements in an engine compartment, or may be opened for maintenance of a desired refrigerant pressure during operation of an air conditioner. During high-speed running of the vehicle, the flap is closed to reduce air resistance and, as such, fuel economy may be enhanced.

However, the ITM system and the active air flap system are operated in an independent manner, respectively. Accordingly, management of thermal energy is inefficient. For example, when the coolant temperature of the engine is decreased, and temperatures of power electronics (PE) elements are increased after the operation mode of the hybrid vehicle is changed from an electric vehicle (EV) mode to a hybrid (HEV) mode, the ITM system opens a heater valve to increase the coolant temperature, whereas the active air flap system opens the flap to decrease temperatures of the PE elements. Accordingly, the efficiency of adjusting the coolant temperature is degraded.

In another example, the active air flap system opens the flap to decrease the temperature of the PE elements, whereas the ITM system closes a radiator valve. In particular, degradation in cooling efficiency may result. Therefore, development of a thermal energy control apparatus for a hybrid vehicle capable of efficiently managing thermal energy through cooperative control of the active air flap system and the ITM system will be required in future.

SUMMARY

Accordingly, the present invention provides a thermal energy control apparatus for a hybrid vehicle, a thermal energy control method thereof, and a hybrid vehicle including the same that substantially obviate one or more problems due to limitations and disadvantages of the related art.

An object of the present invention is to provide an apparatus for controlling thermal energy in a hybrid vehicle by adjusting, in a stepwise manner, an opening degree of a radiator valve in an integrated thermal management unit and an opening degree of a flap valve in an active air flap unit by a cooperative controller adapted to cooperatively operate the integrated thermal management unit and the active air flap unit, thereby being capable of achieving efficient thermal energy management, a thermal energy control method of the apparatus, and a hybrid vehicle including the apparatus.

Additional advantages, objects, and features of the exemplary embodiments will be set forth in part in the description which follows and in part will become apparent to those having ordinary skill in the art upon examination of the following or may be learned from practice of the exemplary embodiments. The objectives and other advantages of the embodiments may be realized and attained by the structure particularly pointed out in the written description and claims hereof as well as the appended drawings.

To achieve these objects and other advantages and in accordance with the purpose of the exemplary embodiments, as embodied and broadly described herein, a thermal energy control apparatus for a hybrid vehicle may include an integrated thermal management unit configured to adjust a coolant temperature by opening or closing a radiator valve, an active air flap unit configured to adjust an intake amount of ambient air by opening or closing a flap valve, and a cooperative controller configured to cooperatively operate the integrated thermal management unit and the active air flap unit.

The cooperative controller may be configured to monitor the coolant temperature, determine, based on the monitored coolant temperature, whether a cooperative control mode is to be executed, determine whether the cooperative control mode is a cooperative control mode of the active air flap unit or a cooperative control mode of the integrated thermal management unit. In response to determining that the cooperative control mode is to be executed, the cooperative controller may be configured to adjust an opening degree of the flap valve based on the coolant temperature when the cooperative control mode is the cooperative control mode of the active air flap unit, and adjust an opening degree of the radiator valve based on the coolant temperature when the cooperative control mode is the cooperative control mode of the integrated thermal management unit.

In another aspect of the present invention, a thermal energy control method of a thermal energy control apparatus for a hybrid vehicle including an integrated thermal management unit to open or close a radiator valve, an active air flap unit to open or close a flap valve, and a cooperative controller to cooperatively operation the integrated thermal management unit and the active air flap unit may include the cooperative controller monitoring a coolant temperature, the cooperative controller determining, based on the monitored coolant temperature, whether a cooperative control mode is to be executed, the cooperative controller determining whether the cooperative control mode is a cooperative control mode of the active air flap unit or a cooperative control mode of the integrated thermal management unit, in response to determining that the cooperative control mode is to be executed, adjusting an opening degree of the flap valve based on the coolant temperature when the cooperative control mode is the cooperative control mode of the active air flap unit, while adjusting an opening degree of the radiator valve based on the coolant temperature when the cooperative control mode is the cooperative control mode of the integrated thermal management unit.

In another aspect of the present invention, a thermal energy control method of a thermal energy control apparatus for a hybrid vehicle including an integrated thermal management unit to open or close a radiator valve, an active air flap unit to open or close a flap valve, and a cooperative controller to cooperatively operation the integrated thermal management unit and the active air flap unit may include the cooperative controller monitoring a coolant temperature, the cooperative controller determining, based on the monitored coolant temperature, whether all of engine coolant temperature, power electronics (PE) coolant temperature and engine running conditions are satisfied, the cooperative controller determining that the hybrid vehicle has transitioned from an electric vehicle (EV) mode to a hybrid electric vehicle (HEV) mode, when all of the engine coolant temperature, PE coolant temperature and engine running conditions are satisfied, and executing the cooperative control mode of the active air flap unit, the cooperative controller determining whether a PE coolant temperature is less than a predetermined lowest temperature, and adjusting an opening degree of the flap valve to be 0%.

The method may further include the cooperative controller determining whether the PE coolant temperature is within a temperature range from the predetermined lowest temperature to a predetermined highest temperature, and adjusting the opening degree of the flap valve to be 50%, when the PE coolant temperature is within the temperature range from the predetermined lowest temperature to the predetermined highest temperature, and the cooperative controller determining whether the PE coolant temperature is greater than the predetermined highest temperature, when the PE coolant temperature is not within a temperature range from the predetermined lowest temperature to the predetermined highest temperature, and adjusting the opening degree of the flap valve to be 100%, when the PE coolant temperature is greater than the predetermined highest temperature.

In another aspect of the present invention, a thermal energy control method of a thermal energy control apparatus for a hybrid vehicle including an integrated thermal management unit to open or close a radiator valve, an active air flap unit to open or close a flap valve, and a cooperative controller to cooperatively operate the integrated thermal management unit and the active air flap unit may include the cooperative controller monitoring a power electronics (PE) coolant temperature, the cooperative controller determining, based on the monitored PE coolant temperature, whether the PE coolant temperature is excessive, the cooperative controller checking whether the integrated thermal management unit is in an excessive temperature control mode, when the PE coolant temperature is excessive, the cooperative controller executing a cooperative control mode of the integrated thermal management unit, when the integrated thermal management unit is in the excessive temperature control mode, the cooperative controller checking whether the PE coolant temperature is within a predetermined first temperature, and adjusting an opening degree of the radiator valve to be 30%, when the PE coolant temperature is within the predetermined first temperature.

The method may further include, the cooperative controller checking whether the PE coolant temperature is within a predetermined second temperature, when the PE coolant temperature is not within the predetermined first temperature, and adjusting the opening degree of the radiator valve to be 60%, when the PE coolant temperature is within the predetermined second temperature, and the cooperative controller checking whether the PE coolant temperature is within a predetermined third temperature, when the PE coolant temperature is not within the predetermined second temperature, and adjusting the opening degree of the radiator valve to be 100%, when the PE coolant temperature is within the predetermined third temperature.

In still another aspect of the present invention, a recording medium on which a program for executing the thermal energy control method of the thermal energy control apparatus for the hybrid vehicle according to one of the above-described aspects of the present invention executes procedures provided in the thermal energy control method of the thermal energy control apparatus for the hybrid vehicle.

In still yet another aspect of the present invention, a hybrid vehicle including a thermal energy control apparatus may further include a hybrid power source having a motor and an engine, and the thermal energy control apparatus controlling thermal energy of the hybrid power source, wherein the thermal energy control apparatus may include an integrated thermal management unit configured to adjust a coolant temperature by opening or closing a radiator valve, an active air flap unit configured to adjust an intake amount of ambient air by opening or closing a flap valve, and a cooperative controller configured to monitor the coolant temperature, determine, based on the monitored coolant temperature, whether a cooperative control mode is to be executed, determine whether the cooperative control mode is a cooperative control mode of the active air flap unit or a cooperative control mode of the integrated thermal management unit.

In response to determining that the cooperative control mode is to be executed, adjusting an opening degree of the flap valve based on the coolant temperature when the cooperative control mode is the cooperative control mode of the active air flap unit, and adjusting an opening degree of the radiator valve based on the coolant temperature when the cooperative control mode is the cooperative control mode of the integrated thermal management unit.

The thermal energy control apparatus for a hybrid vehicle according to at least one exemplary embodiment of the present invention, which is configured as described above, the thermal energy control method thereof, and the hybrid vehicle including the same may efficiently manage thermal energy by adjusting, in a stepwise manner, the opening degree of the radiator valve in the integrated thermal management unit and the opening degree of the flap valve in the active air flap unit by the cooperative controller adapted to cooperatively operation the integrated thermal management unit and the active air flap unit. In other words, based on the present invention, the active air flap unit and the integrated thermal management unit, which are independently operated, may be cooperatively operated in a specific mode and, as such, cooling and warm-up efficiencies may be enhanced.

In accordance with the present invention, thermal source loss generated during warm-up may be minimized and, as such, system operation efficiency may be enhanced. Accordingly, there may be effects of enhancement in fuel economy based on mode driving and enhancement in fuel economy based on real road driving through efficient use of thermal energy according to cooperative control.

In addition, in accordance with the present invention, enhancement in engine efficiency may be achieved through reduction in thermal loss of the engine and, as such, enhancement in fuel economy may be achieved. It may also possible to obtain enhancement in engine driving efficiency in accordance with effective coolant temperature control according to cooperative system control. Furthermore, in accordance with the present invention, driving elements may be maintained in an optimal state through efficient thermal management. Heating performance may also be enhanced by virtue of rapid warm-up. Accordingly, enhancement in merchantability may be provided.

Thus, the present invention may execute cooperative control of the active air flap (AAF) unit and the integrated thermal management (ITM) unit, taking into consideration running characteristics of the vehicle (e.g., transition from the electric vehicle (EV) mode to the hybrid electric vehicle (HEV) mode). In other words, the present invention may execute cooperative control of the active air flap (AAF) unit and the integrated thermal management (ITM) unit by determining whether the HEV mode is executed after running in the EV mode, based on monitoring of an engine coolant temperature and a PE coolant temperature.

Accordingly, the present invention may achieve optimal temperature control by controlling valve opening degrees in a stepwise manner during cooperative control of the active air flap unit. In addition, the present invention may enhance cooling efficiency by executing cooperative control of the integrated thermal management unit during control of the active air flap unit when the PE coolant temperature is excessive.

Particularly, the present invention may maximize cooling efficiency by transitioning the integrated thermal management (ITM) valve control mode of the integrated thermal management unit when the PE coolant temperature exceeds a predetermined maximum temperature range. In addition, the present invention may minimize energy loss by controlling valve opening degrees during ITM control, taking efficiency into consideration.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and along with the description serve to explain the principle of the invention. In the drawings.

DETAILED DESCRIPTION

Figure 1:
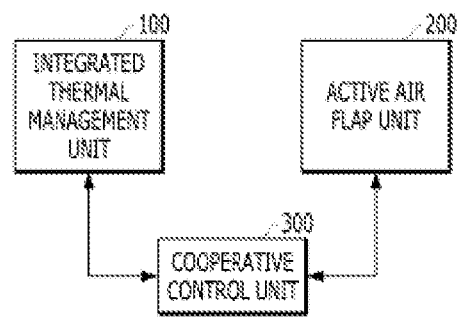
FIG. 1 is a block diagram illustrating a thermal energy control apparatus for a hybrid vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings and, as such, may be easily implemented by one of ordinary skill in the art to which the present invention pertains. The present invention may be embodied in many different forms and should not be construed as limited to the embodiments set forth herein. Matters having no concern with the invention will be omitted, for clarity of explanation. The same or similar elements throughout the specification are designated by the same reference numerals. Elements designated by the same reference numerals throughout the specification mean the same constituent elements.

Hereinafter, an apparatus for controlling thermal energy in a hybrid vehicle, a thermal energy control method thereof, and a hybrid vehicle including the same, which are applicable to exemplary embodiments of the present invention, will be described in detail with reference to FIGS. 1 to 8.

FIG. 1 is a block diagram illustrating a thermal energy control apparatus for a hybrid vehicle according to an exemplary embodiment of the present invention. As illustrated in FIG. 1, the thermal energy control apparatus according to the illustrated exemplary embodiment of the present invention may include an integrated thermal management unit 100 configured to adjust a coolant temperature by opening or closing a radiator valve, an active air flap unit 200 configured to adjust an intake amount of ambient air by opening or closing a flap valve, and a cooperative controller 300 configured to cooperatively operate the integrated thermal management unit 100 and the active air flap unit 200.

The cooperative controller 300 may be configured to monitor the coolant temperature, and determine, based on the monitored coolant temperature, whether a cooperative control mode is to be executed. In response to determining that the cooperative control mode is to be executed, the cooperative controller 300 may be configured to whether the cooperative control mode is a cooperative control mode of the active air flap unit 200 or a cooperative control mode of the integrated thermal management unit 100. When the cooperative control mode is the cooperative control mode of the active air flap unit 200, the cooperative controller 300 may be configured to adjust an opening degree of the flap valve based on the coolant temperature. When the cooperative control mode is the cooperative control mode of the integrated thermal management unit 100, the cooperative controller 300 may be configured to adjust an opening degree of the radiator valve based on the coolant temperature.

In particular, the cooperative controller 300 may be configured to monitor at least one of an engine coolant temperature and a power electronics (PE) coolant temperature. In an exemplary embodiment, the cooperative controller 300 may be configured to determine whether the cooperative control mode is to be executed, based on engine coolant temperature, PE coolant temperature and engine running conditions.

In other words, in response to determining whether the cooperative control mode is to be executed, the cooperative controller 300 may be configured to determine whether all of the engine coolant temperature, PE coolant temperature and engine running conditions are satisfied. When all of the engine coolant temperature, PE coolant temperature and engine running conditions are satisfied, the cooperative controller 300 may be configured to determine that the hybrid vehicle has transitioned from an electric vehicle (EV) mode to a hybrid electric vehicle (HEV) mode. In response to determining that the hybrid vehicle has transitioned from the EV mode to the HEV mode, the cooperative controller 300 may be configured to determine that the cooperative control mode is to be executed.

When the engine coolant temperature is less than a first reference temperature, the cooperative controller 300 may be configured to determine that the engine coolant temperature condition is satisfied. On the other hand, when the PE coolant temperature is greater than a second reference temperature, the cooperative controller 300 may be configured to determine that the PE coolant temperature condition is satisfied. Of course, the present invention is not limited to the above-described conditions. In particular, the first reference temperature and the second reference temperature may differ from each other.

When all of the engine coolant temperature, PE coolant temperature and engine running conditions are not satisfied, the cooperative controller 300 may be configured to operate the integrated thermal management unit 100 to execute an exhaust heat recovery mode. In addition, the cooperative controller 300 may be configured to determine whether a first condition that the engine is in an ON state and a second condition that the engine coolant temperature is less than a predetermined lowest temperature or the engine operates in a high load operation state are satisfied. When both the first condition and the second condition are satisfied, the cooperative controller 300 may be configured to determine, based on the monitored coolant temperature, whether all of the engine coolant temperature, PE coolant temperature and engine running conditions are satisfied.

In another exemplary embodiment, the cooperative controller 300 may be configured to determine whether the cooperative control mode is to be executed, based on the PE coolant temperature. In other words, in response to determining whether the cooperative control mode is to be executed, the cooperative controller 300 may be configured to determine, based on the monitored coolant temperature, whether the PE coolant temperature is excessive. In response to determining that the PE coolant temperature is excessive, the cooperative controller 300 may be configured to determine that the cooperative control mode is to be executed.

In response to determining whether the PE coolant temperature is excessive, the cooperative controller 300 may be configured to determine whether the PE coolant temperature is greater than a predetermined highest temperature. When the PE coolant temperature is greater than the predetermined highest temperature, the cooperative controller 300 may be configured to determine that the PE coolant temperature is excessive. In addition, in response to determining that the PE coolant temperature is not excessive (e.g. less than the highest predetermined temperature), the cooperative controller 300 may be configured to operate the integrated thermal management unit 100 to execute a normal mode.

Further, in response to determining that the hybrid vehicle has transitioned from the EV mode to the HEV mode when it is determined whether the cooperative control mode is the cooperative control mode of the active air flap unit 200, the cooperative controller 300 may be configured to determine that the cooperative control mode is the cooperative control mode of the active air flap unit 200. In particular, the cooperative controller 300 may be configured to determine whether the hybrid vehicle has transitioned from the EV mode to the HEV mode, based on the engine coolant temperature, PE coolant temperature and engine running conditions.

In addition, in response to determining that the PE coolant temperature is excessive when it is determined whether the cooperative control mode is the cooperative control mode of the integrated thermal management unit 100, the cooperative controller 300 may be configured to determine that the cooperative control mode is the cooperative control mode of the integrated thermal management unit 100.

Moreover, the cooperative controller 300 may be configured to adjust the opening degree of the flap valve based on the coolant temperature in the cooperative control mode of the active air flap unit 200. In particular, the cooperative controller 300 may be configured to adjust the opening degree of the flap valve to be 0% when the coolant temperature, that is, the PE coolant temperature, is less than the predetermined lowest temperature, to be 100% when the PE coolant temperature is greater than the predetermined highest temperature, and to be about 1 to 99% when the PE coolant temperature is within a temperature range from the predetermined lowest temperature to the predetermined highest temperature.

For example, when the PE coolant temperature is within a temperature range from the predetermined lowest temperature to the predetermined highest temperature, the cooperative controller 300 may be configured to adjust the opening degree of the flap valve to be about 50%. In addition, in response to adjusting the opening degree of the radiator valve based on the coolant temperature in the cooperative control mode of the integrated thermal management unit 100, the cooperative controller 300 may be configured to check whether the integrated thermal management unit 100 is in an excessive temperature control mode, and adjust the opening degree of the radiator valve based on the coolant temperature, that is, the PE coolant temperature, when the integrated thermal management unit 100 is in the excessive temperature control mode.

Particularly, in response to determining that the integrated thermal management unit 100 is not in the excessive temperature control mode when it is checked whether the integrated thermal management unit 100 is in the excessive temperature control mode, the cooperative controller 300 may be configured to operate the integrated thermal management unit 100 to forcibly enter the excessive temperature control mode.

In addition, the cooperative controller 300 may be configured to adjust the opening degree of the radiator valve to be about 30% when the PE coolant temperature is within a predetermined first temperature range, to be about 60% when the PE coolant temperature is within a predetermined second temperature range, and to be 100% when the PE coolant temperature is within a predetermined third temperature range. Of course, the present invention is not limited to the above-described conditions.

Furthermore, the cooperative controller 300 may be configured to monitor ambient temperature, check whether the monitored ambient temperature is less than a predetermined target temperature, and operate the integrated thermal management unit 100 when the ambient temperature is less than the predetermined target temperature, to execute a heating mode.

If necessary, when the ambient temperature is greater than the predetermined target temperature, the cooperative controller 300 may be configured to determine whether the first condition that the engine is in an ON state and the second condition that the engine coolant temperature is less than the predetermined lowest temperature or the engine operates in a high load operation state are satisfied. When both the first condition and the second condition are satisfied, the cooperative controller 300 may be configured to operate the integrated thermal management unit 100 to execute the exhaust heat recovery mode.

In another case, when neither the first condition nor the second condition is satisfied, the cooperative controller 300 may be configured to determine whether the engine coolant temperature is equal to or greater than a predetermined first temperature, but less than a predetermined second temperature. When the engine coolant temperature is equal to or greater than the predetermined first temperature, but less than the predetermined second temperature, the cooperative controller 300 may be configured to operate the integrated thermal management unit 100 to execute an automatic transmission fluid (ATF) control mode or a heater control mode.

In yet another case, when the engine coolant temperature is equal to or greater than the predetermined first temperature, but less than the predetermined second temperature, the cooperative controller 300 may be configured to determine whether the engine coolant temperature is equal to or greater than a predetermined third temperature. When the engine coolant temperature is equal to or greater than the predetermined third temperature, the cooperative controller 300 may be configured to operate the integrated thermal management unit 100 to execute a coolant temperature control mode.

Particularly, the predetermined third temperature may be greater than the predetermined second temperature. In another case, when the engine coolant temperature is less than the predetermined third temperature, the cooperative controller 300 may be configured to determine whether the engine coolant temperature is equal to or greater than a predetermined fourth temperature. When the engine coolant temperature is equal to or greater than the predetermined fourth temperature, the cooperative controller 300 may be configured to operate the integrated thermal management unit 100 to execute the coolant temperature control mode.

The predetermined fourth temperature may be greater than the predetermined third temperature. Thus, the present invention may efficiently manage thermal energy by adjusting the opening degree of the radiator valve of the integrated thermal management unit 100 and the opening degree of the flap valve of the active air flap unit 200 in a stepwise manner, using the cooperative controller 300 to cooperatively operate the integrated thermal management unit 100 and the active air flap unit 200.

Figure 2:
FIG. 2 is a block diagram illustrating a cooperative controller of FIG. 1 according to an exemplary embodiment of the present invention.

FIG. 2 is a block diagram explaining the cooperative controller 1 of FIG. 1. As illustrated in FIG. 2, the cooperative controller 300 may include a monitor 310 (e.g., a sensor) configured to monitor a coolant temperature, a determinator 320, and a controller 330. The controller 330 may be configured to operate the monitor 310 and the determinator 320. In particular, the monitor 310 may be configured to monitor at least one of an engine coolant temperature and a PE coolant temperature.

The determinator 320 may be configured to determine, based on the monitored coolant temperature, whether the cooperative control mode is to be executed. In response to determining that the cooperative control mode is to be executed, the determinator 320 may be configured to determine whether the cooperative control mode is the cooperative control mode of the integrated thermal management unit 100 or the cooperative control mode of the active air flap unit 200.

Particularly, in response to determining whether the cooperative control mode is to be executed, the determinator 320 may be configured to determine whether all of the engine coolant temperature, PE coolant temperature and engine running conditions are satisfied. When all of the engine coolant temperature, PE coolant temperature and engine running conditions are satisfied, the determinator 320 may be configured to determine that the hybrid vehicle has transitioned from the EV mode to the HEV mode. In response to determining that the hybrid vehicle has transitioned from the EV mode to the HEV mode, the determinator 320 may be configured to determine that the cooperative control mode is to be executed.

If necessary, in response to determining whether the cooperative control mode is to be executed, the determinator 320 may be configured to determine, based on the monitored coolant temperature, whether the PE coolant temperature is excessive. In response to determining that the PE coolant temperature is excessive, the determinator 320 may be configured to determine that the cooperative control mode is to be executed. In addition, in response to determining that the hybrid vehicle has transitioned from the EV mode to the HEV mode when it is determined whether the cooperative control mode is the cooperative control mode of the active air flap unit 200, the determinator 320 may be configured to determine that the cooperative control mode is the cooperative control mode of the active air flap unit 200.

Further, in response to determining that the PE coolant temperature is excessive when it is determined whether the cooperative control mode is the cooperative control mode of the integrated thermal management unit 100, the determinator 320 may be configured to determine that the cooperative control mode is the cooperative control mode of the integrated thermal management unit 100. Additionally, the controller 330 may be configured to adjust the opening degree of the flap valve based on the coolant temperature when the cooperative control mode is the cooperative control mode of the active air flap unit 200, and adjust the opening degree of the radiator valve based on the coolant temperature when the cooperative control mode is the cooperative control mode of the integrated thermal management unit 100.

For example, the controller 330 may be configured to adjust the opening degree of the flap valve based on the coolant temperature in the cooperative control mode of the active air flap unit 200 to be 0% when the coolant temperature, that is, the PE coolant temperature, is less than a predetermined lowest temperature, to be 100% when the PE coolant temperature is greater than a predetermined highest temperature, and to be about 1 to 99% when the PE coolant temperature is within a temperature range from the predetermined lowest temperature to the predetermined highest temperature. In particular, when the PE coolant temperature is within a temperature range from the predetermined lowest temperature to the predetermined highest temperature, the controller 330 may be configured to adjust the opening degree of the flap valve to be about 50%.

In another example, in response to adjusting the opening degree of the radiator valve based on the coolant temperature in the cooperative control mode of the integrated thermal management unit 100, the controller 330 may be configured to check whether the integrated thermal management unit 100 is in an excessive temperature control mode, and adjust the opening degree of the radiator valve based on the coolant temperature, that is, the PE coolant temperature, when the integrated thermal management unit 100 is in the excessive temperature control mode.

In response to determining that the integrated thermal management unit 100 is not in the excessive temperature control mode when it is checked whether the integrated thermal management unit 100 is in the excessive temperature control mode, the controller 330 may be configured to operate the integrated thermal management unit 100 to forcibly enter the excessive temperature control mode.

In addition, the controller 330 may be configured to adjust the opening degree of the radiator valve be about 30% when the PE coolant temperature is within a predetermined first temperature range, to be about 60% when the PE coolant temperature is within a predetermined second temperature range, and to be 100% when the PE coolant temperature is within a predetermined third temperature range. Of course, the present invention is not limited to the above-described conditions.

Figure 3:
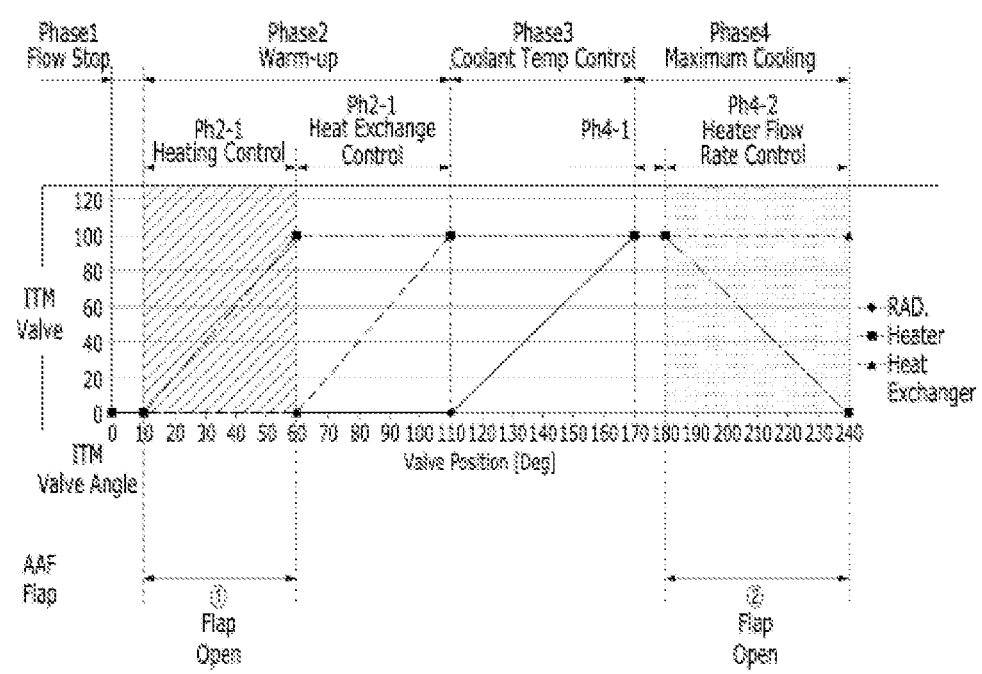
FIG. 3 is a graph illustrating a reduction in coolant temperature control efficiency caused by independent control of an integrated thermal management unit and an active air flap unit according to an exemplary embodiment of the present invention.

FIG. 3 is a graph illustrating a reduction in coolant temperature control efficiency caused by independent control of an integrated thermal management unit and an active air flap unit. As illustrated in FIG. 3, when the integrated thermal management unit and the active air flap unit are independently controlled, management of thermal energy may become inefficient.

For example, when the engine coolant temperature is decreased, and a PE element temperature is increased as a hybrid vehicle transitions from an EV mode to an HEV mode, the integrated thermal management unit may be configured to open an ITM valve to increase the coolant temperature, whereas the active air flap unit may be configured to a flap valve to decrease the PE element temperature, independently of the integrated thermal management unit. Accordingly, there may be a problem in that the efficiency of controlling the coolant temperature is degraded.

Particularly, the PE element temperature may refer to a temperature of a low voltage DC-DC converter (LDC), an automatic transmission fluid (ATF), a motor, or a hybrid start generator (HSG). Of course, the present invention is not limited to the above-described conditions. In another example, the active air flap unit may be configured to independently open the flap to decrease the PE element temperature, whereas the integrated thermal management unit may be configured to independently close the radiator valve, and, as such, there may also be a problem of degradation in cooling efficiency.

However, the present invention may execute cooperative control of the active air flap (AAF) unit and the integrated thermal management (ITM) unit, taking into consideration running characteristics of the vehicle (e.g., transition from the EV mode to the HEV mode). In other words, the present invention may execute cooperative control of the active air flap (AAF) unit and the integrated thermal management (ITM) unit by determining whether the HEV mode is executed after running in the EV mode, based on monitoring of an engine coolant temperature and a PE coolant temperature.

Accordingly, the present invention may achieve optimal temperature control by controlling valve opening degrees in a stepwise manner during cooperative control of the active air flap unit. In addition, the present invention may enhance cooling efficiency by executing cooperative control of the integrated thermal management unit during control of the active air flap unit when the PE coolant temperature is excessive.

In particular, the present invention may maximize cooling efficiency by transitioning the integrated thermal management (ITM) valve control mode of the integrated thermal management unit when the PE coolant temperature exceeds a predetermined maximum temperature range. In addition, the present invention may minimize energy loss by controlling valve opening degrees during ITM control, taking efficiency into consideration.

Figure 4:
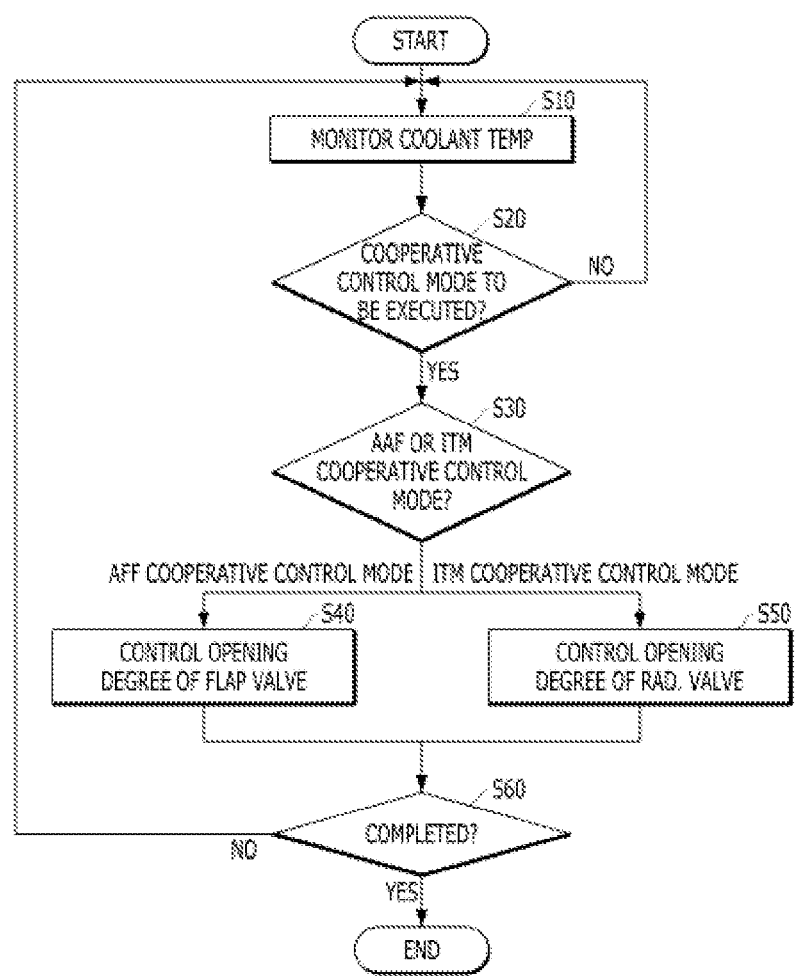
FIGS. 4 and 5 are flowcharts illustrating a thermal energy control method of the thermal energy control apparatus for the hybrid vehicle according to an exemplary embodiment of the present invention.
Figure 5:
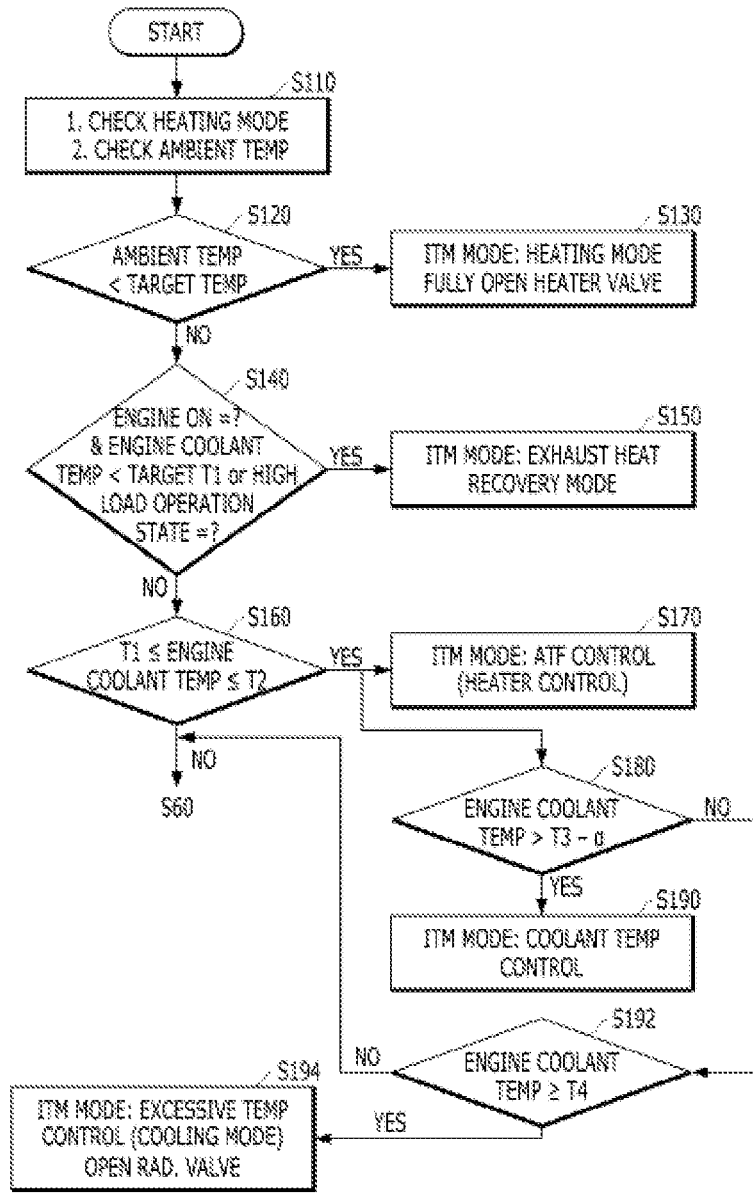

FIGS. 4 and 5 are flowcharts illustrating a thermal energy control method of the thermal energy control apparatus for the hybrid vehicle according to an exemplary embodiment of the present invention. As illustrated in FIGS. 4 and 5, in accordance with the thermal energy control method according to the illustrated exemplary embodiment of the present invention, the cooperative controller may be configured to cooperatively operate the integrated thermal management unit to open or close the radiator valve and the active air flap unit to open or close the flap valve.

First, the cooperative controller may be configured to monitor a coolant temperature (S10). In particular, the cooperative controller may be configured to monitor at least one of an engine coolant temperature and a power electronics (PE) coolant temperature. Thereafter, the cooperative controller may be configured to determine, based on the monitored coolant temperature, whether a cooperative control mode is to be executed (S20). In particular, the cooperative controller may be configured to determine whether the cooperative control mode is to be executed mainly using two methods.

The first method is a method in which the cooperative controller may be configured to determine whether the cooperative control mode is to be executed, based on engine coolant temperature, PE coolant temperature and engine running conditions. In other words, the cooperative controller may be configured to determine whether all of the engine coolant temperature, PE coolant temperature and engine running conditions are satisfied, based on the monitored coolant temperature, determine that the hybrid vehicle transitions from an electric vehicle (EV) mode to a hybrid electric vehicle (HEV) mode when all of the engine coolant temperature, PE coolant temperature and engine running conditions are satisfied, and determine that the cooperative control mode is to be executed in response to determining that the hybrid vehicle transitions from the EV mode to the HEV mode.

In particular, in response to determining whether all of the engine coolant temperature, PE coolant temperature and engine running conditions are satisfied, the cooperative controller may be configured to determine that the engine coolant temperature condition is satisfied, when the engine coolant temperature is less than a first reference temperature. In addition, the cooperative controller may be configured to determine that the PE coolant temperature condition is satisfied when the PE coolant temperature is greater than a second reference temperature.

In addition, in response to determining whether all of the engine coolant temperature, PE coolant temperature and engine running conditions are satisfied, the cooperative controller may be configured to operate the integrated thermal management unit to execute an exhaust heat recovery mode, when all of the engine coolant temperature, PE coolant temperature and engine running conditions are not satisfied.

In response to determining whether all of the engine coolant temperature, PE coolant temperature and engine running conditions are satisfied, the cooperative controller may be configured to determine whether a first condition that the engine is in an ON state and a second condition that the engine coolant temperature is less than a predetermined lowest temperature or the engine operates in a high load operation state are satisfied. When both the first condition and the second condition are satisfied, the cooperative controller may be configured to determine, based on the monitored coolant temperature, whether all of the engine coolant temperature, PE coolant temperature and engine running conditions are satisfied.

Furthermore, the second method is a method in which the cooperative controller may be configured to determine, based on the PE coolant temperature, whether the cooperative control mode is to be executed. In other words, in response to determining whether the cooperative control mode is to be executed, the cooperative controller may be configured to determine, based on the monitored coolant temperature, whether the PE coolant temperature is excessive. In response to determining that the PE coolant temperature is excessive, the cooperative controller may be configured to determine that the cooperative control mode is to be executed.

Particularly, in response to determining whether the PE coolant temperature is excessive, the cooperative controller may be configured to determine whether the PE coolant temperature is greater than a predetermined highest temperature. When the PE coolant temperature is greater than the predetermined highest temperature, the cooperative controller may be configured to determine that the PE coolant temperature is excessive. In addition, in response to determining that the PE coolant temperature is not excessive, the cooperative controller may be configured to operate the integrated thermal management unit 100 to execute a normal mode.

Thereafter, in response to determining that the cooperative control mode is to be executed, the cooperative controller may be configured to determine whether the cooperative control mode is a cooperative control mode of the active air flap (AAF) unit or a cooperative control mode of the integrated thermal management (ITM) unit (S30). In particular, in response to determining that the hybrid vehicle has transitioned from the EV mode to the HEV mode, the cooperative controller may be configured to determine that the cooperative control mode is the cooperative control mode of the active air flap unit.

The cooperative controller may be configured to determine whether the hybrid vehicle has transitioned from the EV mode to the HEV mode, based on the engine coolant temperature, PE coolant temperature and engine running conditions. In addition, in response to determining that the PE coolant temperature is excessive, the cooperative controller may be configured to determine that the cooperative control mode is the cooperative control mode of the integrated thermal management unit.

Further, the cooperative controller may be configured to adjust an opening degree of the flap valve based on the coolant temperature when the cooperative control mode is the cooperative control mode of the active air flap unit (S40). In particular, the cooperative controller may be configured to adjust an opening degree of the flap valve to be 0% when the PE coolant temperature is less than the predetermined lowest temperature, to be 100% when the PE coolant temperature is greater than the predetermined highest temperature, and to be about 1 to 99% when the PE coolant temperature is within a temperature range from the predetermined lowest temperature to the predetermined highest temperature.

In addition, the cooperative controller may be configured to adjust an opening degree of the radiator valve based on the coolant temperature when the cooperative control mode is the cooperative control mode of the integrated thermal management unit (S50). In other words, the cooperative controller may be configured to check whether the integrated thermal management unit is in an excessive temperature control mode, and may be configured to adjust the opening degree of the radiator valve based on the PE coolant temperature when the integrated thermal management unit is in the excessive temperature control mode.

On the other hand, when the integrated thermal management unit is not in the excessive control mode, the cooperative controller may be configured to operate the integrated thermal management unit to forcibly enter the excessive temperature control mode. For example, the cooperative controller may be configured to adjust the opening degree of the radiator valve to be about 30% when the PE coolant temperature is within a predetermined first temperature range, to be about 60% when the PE coolant temperature is within a predetermined second temperature range, and to be 100% when the PE coolant temperature is within a predetermined third temperature range. Of course, the present invention is not limited to the above-described conditions.

Thereafter, the cooperative controller may be configured to determine whether the cooperative control mode has been completed (S60). When the cooperative control has been completed, the cooperative controller may terminate the cooperative control. Meanwhile, as illustrated in FIG. 5, the cooperative controller may be configured to additionally execute a processing mode of the integrated thermal management unit when coolant temperature monitoring S10 is executed.

As illustrated in FIG. 5, the cooperative controller may be configured to monitor a heating mode and ambient temperature (S110). The cooperative controller may subsequently be configured to check whether the monitored ambient temperature is less than a predetermined target temperature (S120).

When the ambient temperature is less than the predetermined target temperature, the cooperative controller may be configured to operate the integrated thermal management unit to fully open the heater valve to execute a heating mode (S130). When the ambient temperature is greater than the predetermined target temperature, the cooperative controller may be configured to determine whether a first condition that the engine is in an ON state and a second condition that the engine coolant temperature is less than a predetermined lowest temperature (Target T1) or the engine operates in a high load operation state are satisfied (S140).

When both the first condition and the second condition are satisfied, the cooperative controller may be configured to operate the integrated thermal management unit to execute an exhaust heat recovery mode (S150). On the other hand, when neither the first condition nor the second condition is satisfied, the cooperative controller may be configured to determine whether the engine coolant temperature is equal to or greater than a predetermined first temperature (T1), but less than a predetermined second temperature (T2) (S160).

When the engine coolant temperature is equal to or greater than the predetermined first temperature, but less than the predetermined second temperature, the cooperative controller may be configured to operate the integrated thermal management unit to execute an automatic transmission fluid (ATF) control mode or a heater control mode (S170). In addition, when the engine coolant temperature is equal to or greater than the predetermined first temperature, but less than the predetermined second temperature, the cooperative controller may be configured to determine whether the engine coolant temperature is equal to or greater than a predetermined third temperature (T3) (S180).

When the engine coolant temperature is equal to or greater than the predetermined third temperature, the cooperative controller may be configured to operate the integrated thermal management unit to execute a coolant temperature control mode (S190). Particularly, the predetermined third temperature may be greater than the predetermined second temperature. When the engine coolant temperature is less than the predetermined third temperature, the cooperative controller may be configured to determine whether the engine coolant temperature is equal to or greater than a predetermined fourth temperature (T4) (S192).

When the engine coolant temperature is equal to or greater than the predetermined fourth temperature, the cooperative controller may be configured to operate the integrated thermal management unit to execute the coolant temperature control mode (S194). Particularly, the predetermined fourth temperature may be greater than the predetermined third temperature.

Figure 6:
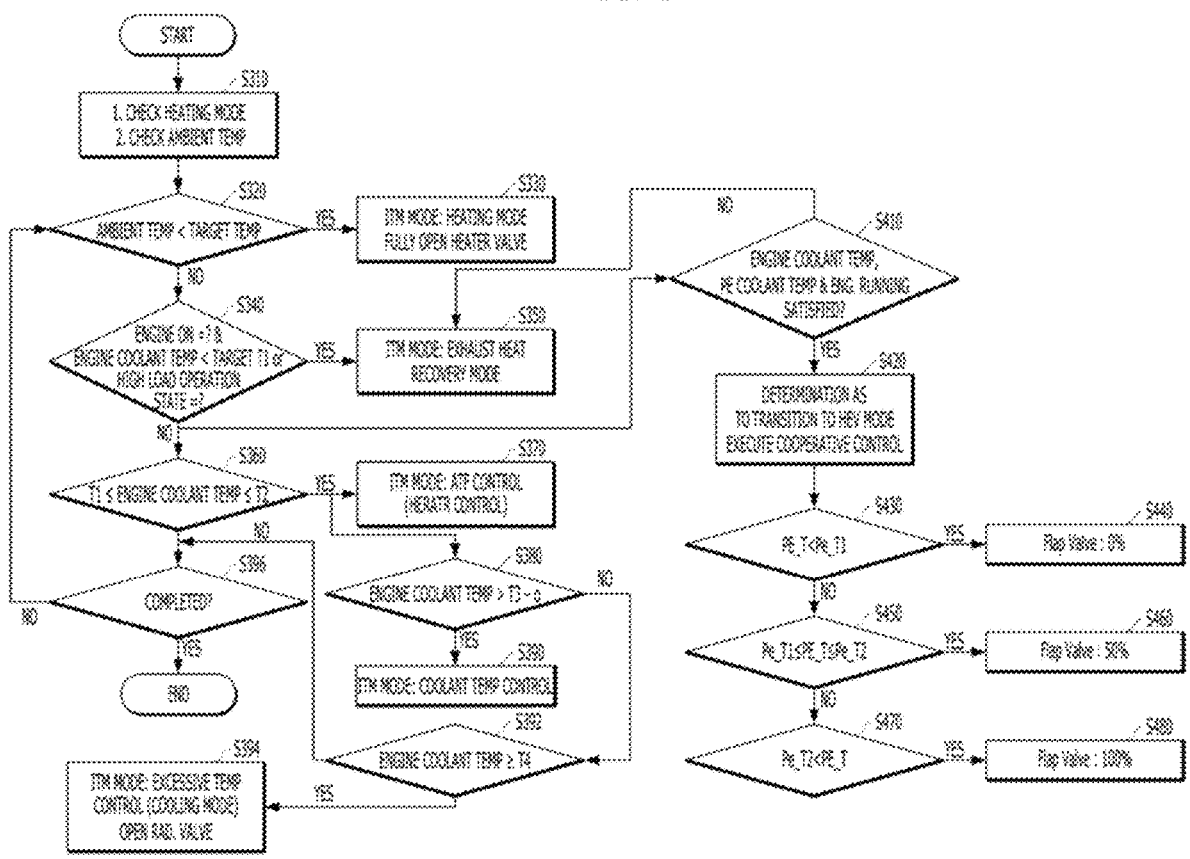
FIG. 6 is a flowchart explaining a cooperative control mode of the active air flap unit in the thermal energy control apparatus for the hybrid vehicle according to an embodiment of the present invention.

FIG. 6 is a flowchart illustrating the cooperative control mode of the active air flap unit in the thermal energy control apparatus for the hybrid vehicle according to an exemplary embodiment of the present invention. As illustrated in FIG. 6, in accordance with the illustrated exemplary embodiment of the present invention, the cooperative controller may be configured to cooperatively operate the integrated thermal management unit to open or close the radiator valve and the active air flap unit to open or close the flap valve.

First, the cooperative controller may be configured to monitor a coolant temperature. In particular, in process of monitoring the coolant temperature, the following process may be additionally executed. In other words, the cooperative controller may be configured to monitor a heating mode and ambient temperature (S310) and determine whether the monitored ambient temperature is less than a predetermined target temperature (S320). When the ambient temperature is less than the predetermined target temperature, the cooperative controller may be configured to subsequently operate the integrated thermal management unit to fully open the heater valve in order to execute a heating mode (S330).

On the other hand, when the ambient temperature is greater than the predetermined target temperature, the cooperative controller may be configured to determine whether a first condition that the engine is in an ON state and a second condition that the engine coolant temperature is less than a predetermined lowest temperature (Target T1) or the engine operates in a high load operation state are satisfied (S340). When both the first condition and the second condition are satisfied, the cooperative controller may be configured to operate the integrated thermal management unit to execute an exhaust heat recovery mode (S350).

When neither the first condition nor the second condition is satisfied, the cooperative controller may be configured to determine whether the engine coolant temperature is equal to or greater than a predetermined first temperature (T1), but less than a predetermined second temperature (T2) (S360). When the engine coolant temperature is equal to or greater than the predetermined first temperature, but less than the predetermined second temperature, the cooperative controller may be configured to operate the integrated thermal management unit to execute an automatic transmission fluid (ATF) control mode or a heater control mode (S370).

In addition, when the engine coolant temperature is equal to or greater than the predetermined first temperature, but less than the predetermined second temperature, the cooperative controller may be configured to determine whether the engine coolant temperature is equal to or higher than a predetermined third temperature (T3) (S380). When the engine coolant temperature is equal to or greater than the predetermined third temperature, the cooperative controller may then be configured to operate the integrated thermal management unit to execute a coolant temperature control mode (S390).

Particularly, the predetermined third temperature may be greater than the predetermined second temperature. When the engine coolant temperature is less than the predetermined third temperature, the cooperative controller may be configured to determine whether the engine coolant temperature is equal to or greater than a predetermined fourth temperature (T4) (S392). When the engine coolant temperature is equal to or greater than the predetermined fourth temperature, the cooperative controller may be configured to operate the integrated thermal management unit to execute the coolant temperature control mode (S394).

The predetermined fourth temperature may be greater than the predetermined third temperature. Further, when neither the first condition nor the second condition is satisfied, the cooperative controller may proceed to step S360 of determining whether the engine coolant temperature is equal to or greater than the predetermined first temperature, but less than the predetermined second temperature. In response to determining at step S360 that the engine coolant temperature is not in the range from the predetermined first temperature to the predetermined second temperature, the cooperative controller may be configured to determine whether the cooperative control mode has been completed (S396). In response to determining that the cooperative control mode has been completed, the cooperative controller may terminate the cooperative control.

Thereafter, the cooperative controller may be configured to determine, based on the monitored coolant temperature, whether all of engine coolant temperature, power electronics (PE) coolant temperature and engine running conditions are satisfied (S410). When all of the engine coolant temperature, PE coolant temperature and engine running conditions are not satisfied, the cooperative controller may be configured to operate the integrated thermal management unit to execute the exhaust heat recovery mode (S350).

When all of the engine coolant temperature, PE coolant temperature and engine running conditions are satisfied, the cooperative controller may be configured to determine that the hybrid vehicle has transitioned from an electric vehicle (EV) mode to a hybrid electric vehicle (HEV) mode. In particular, the cooperative controller may be configured to operate the active air flap unit to enter the cooperative control mode (S420).

Thereafter, the cooperative controller may be configured to determine whether the PE coolant temperature (PE_T) is less than a predetermined lowest temperature (PE_T1) (S430). When the PE coolant temperature (PE_T) is less than a predetermined lowest temperature (PE_T1), the cooperative controller may be configured to adjust the opening degree of the flap valve to be 0% (S440).

When the PE coolant temperature (PE_T) is greater than the predetermined lowest temperature (PE_T1), the cooperative controller may be configured to determine whether the PE coolant temperature (PE_T) is within a range from the predetermined lowest temperature (PE_T1) to a predetermined highest temperature (TE_T2) (S450). When the PE coolant temperature (PE_T) is within a range from the predetermined lowest temperature (PE_T1) to the predetermined highest temperature (TE_T2), the cooperative controller may be configured to adjust the opening degree of the flap valve to be about 50% (S460).

Additionally, when the PE coolant temperature (PE_T) is not within the range from the predetermined lowest temperature (PE_T1) to the predetermined highest temperature (TE_T2), the cooperative controller may be configured to determine whether the PE coolant temperature (PE_T) is greater than the predetermined highest temperature (TE_T2) (S470). When the PE coolant temperature (PE_T) is greater than the predetermined highest temperature (TE_T2), the cooperative controller may be configured to adjust the opening degree of the flap valve to be 100% (S480).

Figure 7:
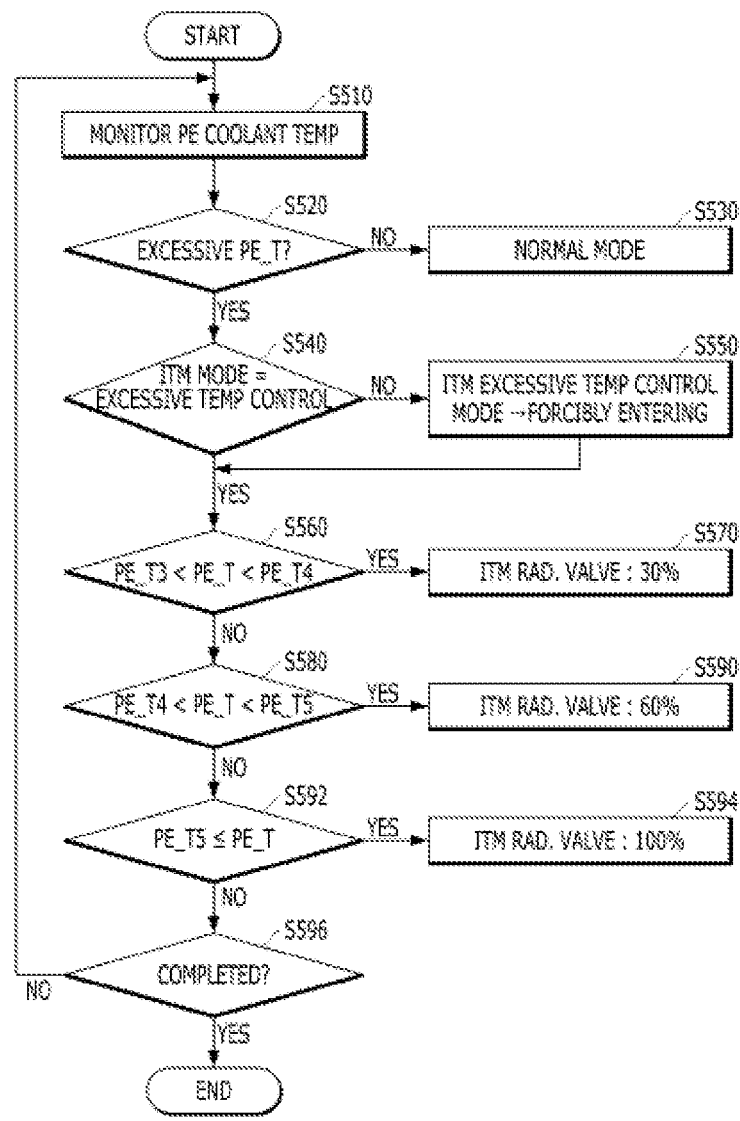
FIG. 7 is a flowchart illustrating a cooperative control mode of the integrated thermal management in the thermal energy control apparatus for the hybrid vehicle according to an exemplary embodiment of the present invention.

FIG. 7 is a flowchart illustrating the cooperative control mode of the integrated thermal management in the thermal energy control apparatus for the hybrid vehicle according to an exemplary embodiment of the present invention. As illustrated in FIG. 7, in accordance with the illustrated exemplary embodiment of the present invention, the cooperative controller may be configured to cooperatively operate the integrated thermal management unit to open or close the radiator valve and the active air flap unit to open or close the flap valve.

First, the cooperative controller may be configured to monitor a power electronics (PE) coolant temperature (S510). The cooperative controller may then be configured to determine, based on the monitored PE coolant temperature, whether the PE coolant temperature is excessive (S520). In particular, the cooperative controller may be configured to determine whether the PE coolant temperature is greater than a predetermined highest temperature. When the PE coolant temperature is greater than the predetermined highest temperature, the cooperative controller may be configured to determine that the PE coolant temperature is excessive.

In response to determining that the PE coolant temperature is not excessive, the cooperative controller may be configured to operate the integrated thermal management unit to execute a normal mode (S530). On the other hand, in response to determining that the PE coolant temperature is excessive, the cooperative controller 300 may be configured to check whether the integrated thermal management unit is in an excessive temperature control mode (S540).

Further, in response to determining that the integrated thermal management unit is not in the excessive temperature control mode, the cooperative controller may be configured to operate the integrated thermal management unit to forcibly enter the excessive temperature control mode (S550). When the integrated thermal management unit is not in the excessive temperature control mode, the cooperative controller may be configured to operate the integrated thermal management unit to enter the cooperative control mode.

Thereafter, the cooperative controller may be configured to check whether the PE coolant temperature is within a predetermined first temperature range (S560). When the PE coolant temperature is within the predetermined first temperature range, the cooperative controller may be configured to adjust the opening degree of the radiator valve to be 30% (S570). When the PE coolant temperature is not within (e.g., beyond) the predetermined first temperature range, the cooperative controller may be configured to check whether the PE coolant temperature is within a predetermined second temperature range (S580). When the PE coolant temperature is within the predetermined second temperature range, the cooperative controller may be configured to adjust the opening degree of the radiator valve to be 60% (S590).

When the PE coolant temperature is not within (e.g., beyond) the predetermined second temperature range, the cooperative controller may be configured to check whether the PE coolant temperature is within a predetermined third temperature range (S592). When the PE coolant temperature is within the predetermined third temperature range, the cooperative controller may be configured to adjust the opening degree of the radiator valve to be 100% (S594). Thereafter, the cooperative controller may be configured to determine whether the cooperative control mode has been completed (S596). When the cooperative control mode has been completed, the cooperative controller may terminate the cooperative control.

In response to monitoring the PE coolant temperature, the cooperative controller may additionally execute the procedure of FIG. 5. In other words, the cooperative controller may be configured to operate, based on ambient temperature and the predetermined target temperature, the integrated thermal management unit to fully open the heater valve to execute the heating mode. In addition, when ambient temperature is greater than the predetermined target temperature, the cooperative controller may be configured to determine whether the first condition that the engine is in an ON state and the second condition that the engine coolant temperature is less than the predetermined lowest temperature or the engine operates in a high load operation state are satisfied. Based on results of the determination, the cooperative controller may be configured to operate the integrated thermal management unit to execute the exhaust heat recovery mode.

When neither the first condition nor the second condition is satisfied, the cooperative controller may be configured to determine whether the engine coolant temperature is equal to or greater than the predetermined first temperature, but less than the predetermined second temperature. Based on results of the determination, the cooperative controller may be configured to operate the integrated thermal management unit to execute the automatic transmission fluid (ATF) control mode or the heater control mode.

When the engine coolant temperature is equal to or greater than the predetermined first temperature, but less than the predetermined second temperature, the cooperative controller may be configured to determine whether the engine coolant temperature is equal to or greater than the predetermined third temperature. Based on results of the determination, the cooperative controller may be configured to operate the integrated thermal management unit to execute the coolant temperature control mode.

Additionally, when the engine coolant temperature is less than the predetermined third temperature, the cooperative controller may be configured to determine whether the engine coolant temperature is equal to or greater than the predetermined fourth temperature. Based on results of the determination, the cooperative controller may be configured to operate the integrated thermal management unit to execute the excessive temperature control mode.

Figure 8:
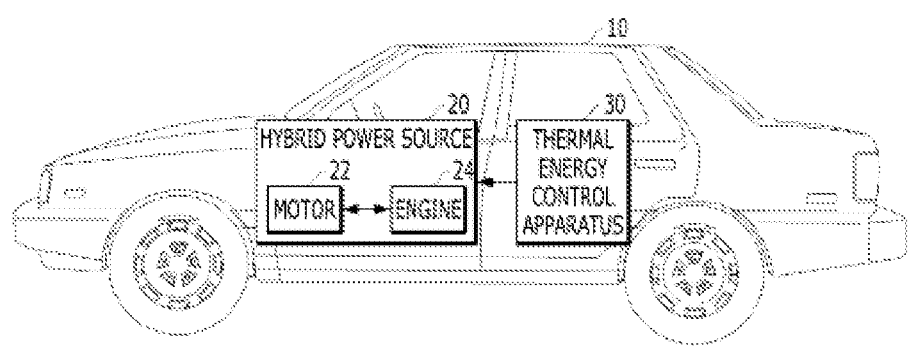
FIG. 8 is a schematic view illustrating a hybrid vehicle including a thermal energy control apparatus according to an exemplary embodiment of the present invention.

FIG. 8 is a schematic view illustrating a hybrid vehicle including a thermal energy control apparatus according to an exemplary embodiment of the present invention. As illustrated in FIG. 8, the hybrid vehicle according to the illustrated exemplary embodiment of the present invention, which is designated by reference numeral "10", may include a hybrid power source 20 including a motor 22 and an engine 24, and a thermal energy control apparatus 30 for controlling thermal energy from the hybrid power source 20.

The hybrid power source 20 of the hybrid vehicle 10 may be included in a powertrain. In particular, the powertrain may employ a parallel type hybrid system in which the motor is mounted between an internal combustion engine 24 and a transmission, together with an engine clutch. In such a hybrid vehicle, the motor 22 is first driven using electric power from a battery in an opened state of the engine clutch and, thus, driving power from the motor 22 is transmitted to wheels via the transmission and a final driver (FD), to drive the wheels (that is, an EV mode).

When greater driving power is required as the hybrid vehicle is gradually accelerated, a hybrid start generator (HSG) operates, thereby driving the engine 24. When the rotational velocity of the engine 24 becomes equal to the rotational velocity of the motor 22, engagement of the engine clutch is achieved and, thus, the engine 24 and the motor 22 simultaneously drive the vehicle 10 (e.g., transition from the EV mode to the HEV mode).

When a predetermined engine-off condition such as speed reduction of the hybrid vehicle is subsequently satisfied, the engine clutch may be opened and, thus the engine 24 is stopped (e.g., transition from the HEV mode to the EV mode). In this state, the hybrid vehicle 10 may be configured to charge the battery through the motor 22, using driving force of the wheels. Such charging is referred to as "braking energy regeneration" or "regenerative braking".

Accordingly, the hybrid start generator may function as a starter motor when the engine 24 starts, and may function as a generator during recovery of rotational energy of the engine 24 after the engine 24 starts or in an engine start-off state. The thermal energy control apparatus may include an integrated thermal management unit configured to adjust a coolant temperature by opening or closing a radiator valve, and an active air flap unit configured to adjust an intake amount of ambient air by opening or closing a flap valve, and a cooperative controller.

The cooperative controller may be configured to monitor the coolant temperature, and determine, based on the monitored coolant temperature, whether a cooperative control mode is to be executed. In response to determining that the cooperative control mode is to be executed, the cooperative controller may be configured to determine whether the cooperative control mode is a cooperative control mode of the active air flap unit or a cooperative control mode of the integrated thermal management unit. When the cooperative control mode is the cooperative control mode of the active air flap unit, the cooperative controller may be configured to adjust an opening degree of the flap valve based on the coolant temperature. When the cooperative control mode is the cooperative control mode of the integrated thermal management unit, the cooperative controller may be configured to adjust an opening degree of the radiator valve in accordance with the coolant temperature.

In addition, the present invention may be embodied as a non-transitory computer readable medium on which a program for executing a thermal energy control method of a thermal energy control apparatus for a hybrid vehicle is written, the recording medium being readable by a computer. The non-transitory computer readable medium may execute procedures provided in the thermal energy control method of the thermal energy control apparatus for the hybrid vehicle according to each exemplary embodiment of the present invention.

In accordance with the present invention, as described above, it may be possible to efficiently manage thermal energy by adjusting, in a stepwise manner, the opening degree of the radiator valve in the integrated thermal management unit and the opening degree of the flap valve in the active air flap unit by the cooperative controller adapted to cooperatively control the integrated thermal management unit and the active air flap unit. In other words, in accordance with the present invention, the active air flap unit and the integrated thermal management unit, which are operated independently, may be operated cooperatively in a specific mode and, as such, cooling and warm-up efficiencies may be enhanced.

In accordance with the present invention, thermal source loss generated during warm-up may be minimized and, as such, system operation efficiency may be enhanced. Accordingly, there may be effects of enhancement in fuel economy based on mode driving and enhancement in fuel economy based on real road driving through efficient use of thermal energy according to cooperative control.

In addition, in accordance with the present invention, enhancement in engine efficiency may be achieved through reduction in thermal loss of the engine and, as such, enhancement in fuel economy may be achieved. It may also possible to obtain enhancement in engine driving efficiency in accordance with effective coolant temperature control according to cooperative system control.

Furthermore, in accordance with the present invention, driving elements may be maintained in an optimal state through efficient thermal management. Heating performance may also be enhanced by virtue of rapid warm-up. Accordingly, enhancement in merchantability may be provided.

Meanwhile, the present invention may be embodied as code, which may be written on a program-stored recording medium that can be read by a computer. The recording medium that can be read by a computer includes all types of recording media, on which data that can be read by a computer system is written. Examples of recording media that can be read by a computer may be a hard disk drive (HDD), a solid state drive (SSD), a silicon disk drive (SDD), a read only memory (ROM), a random access memory (RAM), a CD-ROM, a magnetic tape, a floppy disk, an optical data storage, and the like.

It will be appreciated by persons skilled in the art that the effects that may be achieved through the present invention are not limited to what has been particularly described hereinabove and other advantages of the present invention will be more clearly understood from the above detailed description. It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A thermal energy control apparatus for a hybrid vehicle, comprising:
    an integrated thermal management unit configured to adjust a coolant temperature by opening or closing a radiator valve;
    an active air flap unit configured to adjust an intake amount of ambient air by opening or closing a flap valve; and
    a cooperative controller configured to cooperatively operate the integrated thermal management unit and the active air flap unit,
    wherein the cooperative controller is configured to:
        monitor the coolant temperature;
        determine, based on the monitored coolant temperature, whether cooperative control mode is to be executed;
        determine whether the cooperative control mode is a cooperative control mode of the active air flap unit or a cooperative control mode of the integrated thermal management unit, in response to determining that the cooperative control mode is to be executed;
        adjust an opening degree of the flap valve based on the coolant temperature when the cooperative control mode is the cooperative control mode of the active air flap unit; and
        adjust an opening degree of the radiator valve based on the coolant temperature when the cooperative control mode is the cooperative control mode of the integrated thermal management unit.

2. The thermal energy control apparatus according to claim 1, wherein the cooperative controller is configured to monitor at least one of an engine coolant temperature and a power electronics (PE) coolant temperature.

3. The thermal energy control apparatus according to claim 1, wherein the cooperative controller is configured to:
    determine whether all of engine coolant temperature, power electronics (PE) coolant temperature and engine running conditions are satisfied, in response to determining whether the cooperative control mode is to be executed;
    determine that the hybrid vehicle has transitioned from an electric vehicle (EV) mode to a hybrid electric vehicle (HEV) mode, when all of the engine coolant temperature, the PE coolant temperature and the engine running conditions are satisfied; and
    determine that the cooperative control mode is to be executed, in response to determining that the hybrid vehicle has transitioned from the EV mode to the HEV mode.

4. The thermal energy control apparatus according to claim 1, wherein the cooperative controller is configured to:
    determine, based on the monitored coolant temperature, whether a power electronics (PE) coolant temperature is excessive, in response to determining whether the cooperative control mode is to be executed; and
    determine that the cooperative control mode is to be executed, in response to determining that the PE coolant temperature is excessive.

5. The thermal energy control apparatus according to claim 1, wherein the cooperative controller is configured to determine that the cooperative control mode is the cooperative control mode of the active air flap unit, in response to determining that the hybrid vehicle has transitioned from an EV mode to a HEV mode.

6. The thermal energy control apparatus according to claim 1, wherein the cooperative controller is configured to determine that the cooperative control mode is the cooperative control mode of the integrated thermal management unit, in response to determining that a power electronics (RE) coolant temperature is excessive.

7. The thermal energy control apparatus according to claim 1, wherein the cooperative controller is configured to:

adjust the opening degree of the flap valve based on the coolant temperature in the cooperative control mode of the active air flap unit to be 0% when a power electronics (PE) coolant temperature as the coolant temperature is less than a predetermined lowest temperature;

adjust the opening degree of the flap valve to be 100% when the PE coolant temperature is greater than a predetermined highest temperature; and adjust the opening degree of the flap valve to be about 1 to 99% when the PE coolant temperature is within a temperature range from the predetermined lowest temperature to the predetermined highest temperature.

8. The thermal energy control apparatus according to claim 1, wherein the cooperative controller is configured to:
check whether the integrated thermal management unit is in an excessive temperature control mode, in response to adjusting the opening degree of the radiator valve based the coolant temperature in the cooperative control mode of the integrated thermal management unit; and adjust the opening degree of the radiator valve based on a power electronics (PE) coolant temperature as the coolant temperature, when the integrated thermal management unit is in the excessive temperature control mode.

9. The thermal energy control apparatus according to claim 1, wherein the cooperative controller includes:
a monitor configured to monitor the cooling temperature;
a determinator configured to determine, based on the monitored coolant temperature, whether the cooperative control mode is to be executed, and determine whether the cooperative control mode is the cooperative control mode of the integrated thermal management unit or the cooperative control mode of the active air flap unit, in response to determining that the cooperative control mode is to be executed; and
a controller configured to adjust the opening degree of the flap valve based on the coolant temperature when the cooperative control mode is the cooperative control mode of the active air flap unit, while adjusting the opening degree of the radiator valve based on the coolant temperature when the cooperative control mode is the cooperative control mode of the integrated thermal management unit.

10. A thermal energy control method of a thermal energy control apparatus for a hybrid vehicle including an integrated thermal management unit to open or close a radiator valve and an active air flap unit to open or close a flap valve, comprising:
cooperatively operating, by a cooperative controller, the integrated thermal management unit and the active air flap unit,
monitoring, by the cooperative controller, a coolant temperature;
determining, by the cooperative controller, based on the monitored coolant temperature, whether a cooperative control mode is to be executed;
determining, by the cooperative controller, whether the cooperative control mode is a cooperative control mode of the active air flap unit or a cooperative control mode of the integrated thermal management unit, in response to determining that the cooperative control mode is to be executed; and
adjusting, by the cooperative controller, an opening degree of the flap valve based on the coolant temperature when the cooperative control mode is the cooperative control mode of the active air flap unit, while adjusting an opening degree of the radiator valve based on the coolant temperature when the cooperative control mode is the cooperative control mode of the integrated thermal management unit.

11. The thermal energy control method according to claim 10, wherein the monitoring the coolant temperature includes:
monitoring at least one of an engine coolant temperature and a power electronics (PE) coolant temperature.

12. The thermal energy control method according to claim 10, wherein the determining whether the cooperative control mode is to be executed includes:
determining, based on the monitored coolant temperature, whether all of engine coolant temperature, power electronics (PE) coolant temperature and engine running conditions are satisfied;
determining that the hybrid vehicle has transitioned from an electric vehicle (EV) mode to a hybrid electric vehicle (HEV) mode, when all of the engine coolant temperature, the PE coolant temperature and the engine running conditions are satisfied; and
determining that the cooperative control mode is to be executed, in response to determining that the hybrid vehicle has transitioned from the EV mode to the HEV mode.

13. The thermal energy control method according to claim 12, wherein the integrated thermal management unit is operated in an exhaust heat recovery mode when all of the engine coolant temperature, the PE coolant temperature and the engine running conditions are not satisfied, in response to the determination as to whether all the engine coolant temperature, the PE coolant temperature and the engine running conditions are satisfied.

14. The thermal energy control method according to claim 10, wherein the determining whether the cooperative control mode is to be executed includes:
determining, based on the monitored coolant temperature, whether a power electronics (PE) coolant temperature is excessive; and
determining that the cooperative control mode is to be executed, in response to determining that the PE coolant temperature is excessive.

15. The thermal energy control method according to claim 14, wherein the integrated thermal management unit is operated to execute a normal mode, in response to determining that the PE coolant temperature is not excessive.

16. The thermal energy control method according to claim 10, wherein the determining of whether the cooperative control mode is the cooperative control mode of the active air flap unit includes:
determining that the cooperative control mode is the cooperative control mode of the active air flap unit, in response to determining that the hybrid vehicle has transitioned from an EV mode to a HEV mode.

17. The thermal energy control method according to claim 10, wherein the determining of whether the cooperative control mode is the cooperative control mode of the integrated thermal management unit includes:
determining that the cooperative control mode is the cooperative control mode of the integrated thermal management unit, in response to determining that a power electronics (PE) coolant temperature is excessive.

18. The thermal energy control method according to claim 10, wherein the adjusting of the opening degree of the flap valve based on the coolant temperature includes:

adjusting the opening degree of the flap valve to be 0% when a power electronics (PE) coolant temperature as the coolant temperature is less than a predetermined lowest temperature;

adjusting the opening degree of the flap valve to be 100% when the PE coolant temperature is greater than a predetermined highest temperature; and adjusting the opening degree of the flap valve to be about 1 to 99% when the PE coolant temperature is within a temperature range from the predetermined lowest temperature to the predetermined highest temperature.

19. The thermal energy control method according to claim 10, wherein the adjusting of the opening degree of the radiator valve based on the coolant temperature includes:

checking whether the integrated thermal management unit is in an excessive temperature control mode; and adjusting the opening degree of the radiator valve based on a power electronics (PE) coolant temperature as the coolant temperature, when the integrated thermal management unit is in the excessive temperature control mode.

20. The thermal energy control method according to claim 19, wherein the checking of whether the integrated thermal management unit is in the excessive temperature control mode includes:

operating the integrated thermal management unit to forcibly enter the excessive temperature control mode, when the integrated thermal management unit is not in the excessive temperature control mode.

\* \* \* \* \*